United States Patent
Matsubara et al.

Patent Number: 5,920,744
Date of Patent: Jul. 6, 1999

[54] IMAGE FORMING APPARATUS AND METHOD FOR EFFICIENTLY FORMING IMAGES EVEN AFTER THE OCCURRENCE OF A JAM

[75] Inventors: Akitoshi Matsubara; Masakazu Fukuchi; Tadayoshi Ikeda; Satoshi Haneda; Kunio Shigeta; Yotaro Sato, all of Hachioji, Japan

[73] Assignee: Konica Corporation, Tokyo, Japan

[21] Appl. No.: 08/988,467

[22] Filed: Dec. 10, 1997

[30] Foreign Application Priority Data

Dec. 24, 1996 [JP] Japan .................................. 8-343218

[51] Int. Cl.⁶ .................................................. G03G 15/00
[52] U.S. Cl. .............................. 399/19; 399/309; 395/116
[58] Field of Search ................................ 399/19, 21, 308, 399/18, 309, 85; 358/296, 400, 401; 395/115, 116, 117

[56] References Cited

U.S. PATENT DOCUMENTS

| | | | |
|---|---|---|---|
| 4,571,069 | 2/1986 | Kimura et al. | 395/113 |
| 4,673,990 | 6/1987 | Okada | 358/296 |
| 5,027,159 | 6/1991 | Oda et al. | 399/309 |
| 5,282,050 | 1/1994 | Ishizuka et al. | 358/400 |

*Primary Examiner*—Joan Pendegrass
*Attorney, Agent, or Firm*—Frishauf, Holtz, Goodman, Langer & Chick

[57] ABSTRACT

An apparatus for forming images on at least one surface of a sheet includes a reader for reading image information on documents, a memory for storing image signals output by the reader, and an image forming unit for selectively forming one of: (i) two page toner images corresponding to the image signals of two pages of the documents separately on two image carrying members, and (ii) a single toner image on one of the two image carrying members. A jam detector detects a jammed sheet, and a delivery detector detects delivery of a copied sheet to outside the apparatus. Image signals are eliminated from memory in accordance with a progression of image formation. If the jam detector detects the occurrence of the jammed sheet, a control unit prohibits the memory from eliminating the image signals until the delivery detector detects a next sheet delivered from the apparatus, so that the selected image expected to be formed by the image forming unit on the jammed sheet may be properly formed on a following sheet based on the image signals retained in the memory. A selector is provided for selecting one of a both-surface copy mode and a single-surface copy mode, wherein the control unit controls the memory to store the image signals corresponding to two pages of the documents when the both-surface copy mode is selected and to store the image signals corresponding to the single page of the documents when the single-surface copy mode is selected.

7 Claims, 8 Drawing Sheets

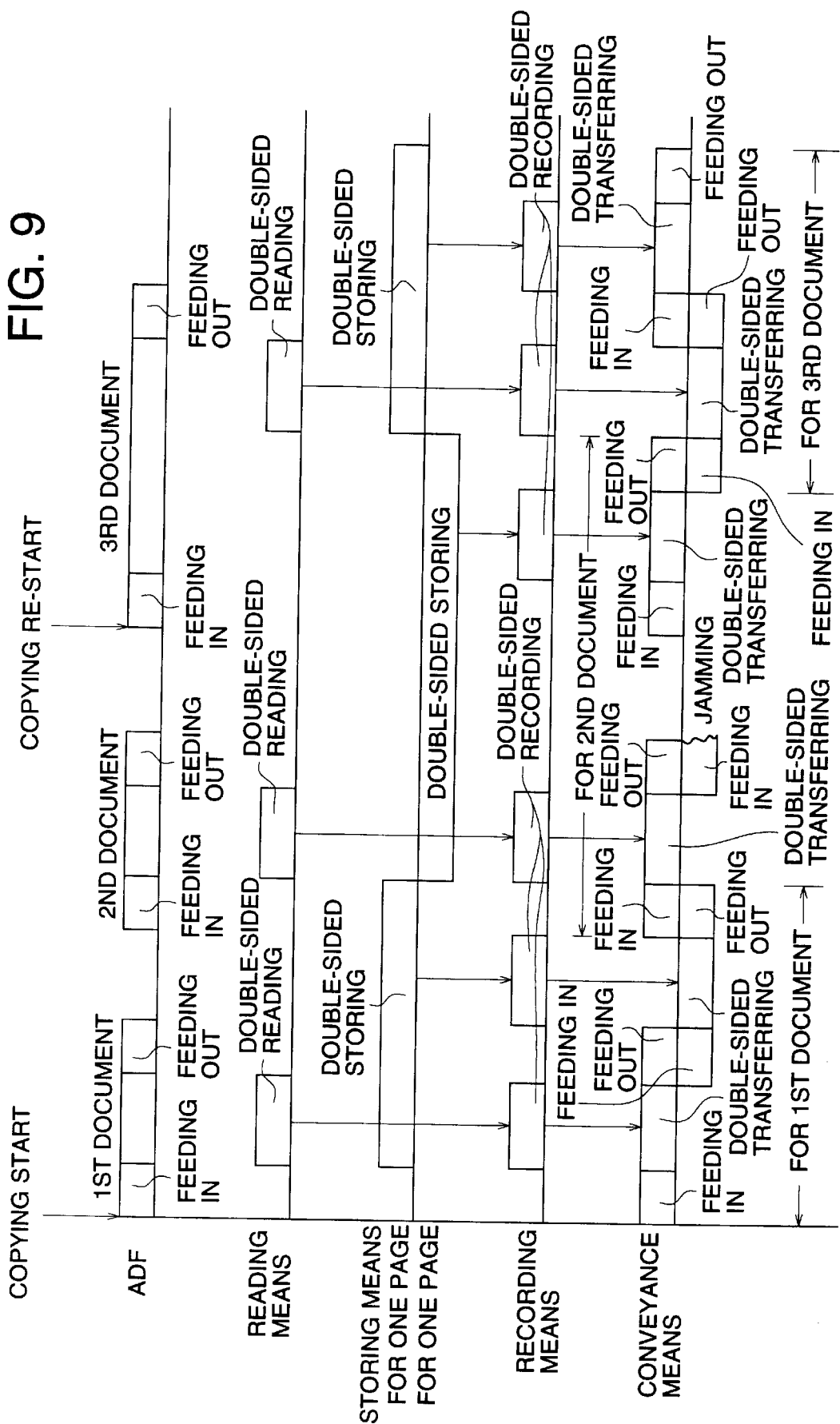

IMAGE FORMING APPARATUS AND METHOD FOR EFFICIENTLY FORMING IMAGES EVEN AFTER THE OCCURRENCE OF A JAM

BACKGROUND OF THE INVENTION

The present invention relates to an image forming apparatus which conducts image recording on a recording paper (a recording sheet) based on digital image information obtained by the use of a document image reading apparatus provided with an automatic document conveyance function. More specifically, the present invention relates to an image forming apparatus in which, if the above-mentioned recording paper is jammed, image recording can be resumed immediately utilizing image information stored in a storing means without re-reading the document image.

In the above-mentioned digital image forming apparatus, when copying is conducted using an ADF (automatic document feeder), if jamming occurred before a recording paper on which an image is recorded is discharged to outside the apparatus, in the same manner as in a so-called analogue image forming apparatus in which, by means of a reflected beam from the document, the surface of the photoreceptor is subjected to scanning and exposed, and then, an image formed on the surface of the photoreceptor is transferred onto the recording paper to be recorded, conventionally, before resuming copying after removing a jammed paper, the document corresponding to image recording onto the jammed paper must be returned to the start position of conveyance from the ADF. Therefore, there might occur errors during the return of the document to the ADF or the front surface and the rear surface of the recording paper might be mishandled so that operation was troublesome.

In addition, when recording images on both sides, if jamming occurred, it was necessary to re-read images for both sides.

SUMMARY OF THE INVENTION

The present invention was contrived for overcoming the above-mentioned problems on a digital image forming apparatus. According to the invention, copying is conducted using an ADF, if jamming occurs before a recording paper on which aforesaid images are formed is discharged to outside the apparatus, when copying is resumed after removing jammed paper, it is not necessary to return the document corresponding to image recording onto the jammed paper. It is an object of the invention to provide an image forming apparatus having favorable operability and copying efficiency and to provide a control method therefor.

Another objective is to provide an image forming apparatus having favorable operability and copying efficiency wherein, when double-sided copying is conducted, even if jamming occurs, image formation on the following document is conducted without re-reading an image for a double-side which has already been read and and makes it unnecessary to return the document when jamming occurs.

The above-mentioned objectives are attained by an image forming apparatus comprising a document conveyance means which successively conveys plural number of documents, a reading means which reads image information of aforesaid document, a storing means which temporarily stores double-sided image information by inputting image information from aforesaid reading means, plural toner image forming means which forms toner images on both sides of recording paper based on image information from the above-mentioned reading means or a storing means, a recording paper conveyance means which conveys a recording means, plural transfer means which transfers toner image on both sides of recording paper, a fixing means which heats collectively a recording paper in which toner images are formed on the above-mentioned both sides and fixes, a paper discharging means which discharges aforesaid recording paper outside the apparatus, a jamming detection means which detects jamming of recording paper conveyed by means of the above-mentioned recording paper conveyance means, a paper discharging means which informs paper discharging of the above-mentioned recording paper, a displaying means which informs the occurrence of jamming based on detection information of the above-mentioned jamming detection means and a copying control means which controls all of the above-mentioned means based on copying starting operation and which controls in such a manner that, when jamming detection information is inputted from the above-mentioned jamming detection means, image formation onto the first recording paper based on copying resumption operation thereafter is conducted based on image information for both sides which has been recorded onto a jammed paper stored in the above-mentioned storing means or which was planned to be recorded and temporary storing by the above-mentioned storing means is maintained until the above-mentioned paper discharging detection means detects discharging of the recording paper in which images of image information on both sides are formed.

In addition, the above-mentioned objectives are attained by a control method for controlling an image forming apparatus comprising a document conveyance means which successively conveys plural number of documents, a reading means which reads image information of aforesaid document, a storing means which temporarily stores double-sided image information by inputting image information from aforesaid reading means, plural toner image forming means which forms toner images on both sides of recording paper based on image information from the above-mentioned reading means or a storing means, a recording paper conveyance means which conveys a recording means, plural transfer means which transfers toner image on both sides of recording paper, a fixing means which heats collectively a recording paper in which toner images are formed on the above-mentioned both sides and fixes, a paper discharging means which discharges aforesaid recording paper outside the apparatus, a jamming detection means which detects jamming of recording paper conveyed by means of the above-mentioned recording paper conveyance means, a paper discharging means which informs paper discharging of the above-mentioned recording paper, a displaying means which informs the occurrence of jamming based on detection information of the above-mentioned jamming detection means and a copying control means which controls all of the above-mentioned means based on copying starting operation, wherein, when jamming detection information is inputted from the above-mentioned jamming detection means, image formation onto the first recording paper based on copying resumption operation thereafter is conducted based on image information for both sides which has been recorded onto a jammed paper stored in the above-mentioned storing means or which was planned to be recorded and temporary storing by the above-mentioned storing means is maintained until the above-mentioned paper discharging detection means detects discharging of the recording paper in which images of image information on both sides are formed.

Namely, in the above-mentioned image forming apparatus and its control method, image recording for the both sides of the initial recording paper after copying is resumed after jammed paper is removed is conducted based on image information from the temporary storing in the storing means until discharging of the recording paper on which an image has been recorded is detected by the discharging detection means. Therefore, it is not necessary to return a document which corresponds to image recording on the jammed paper to the starting position of the document.

In addition, the above-mentioned objectives are attained by a control method for controlling an image forming apparatus comprising a document conveyance means which successively conveys plural number of documents, a reading means which reads image information of aforesaid document, a storing means which temporarily stores double-sided image information by inputting image information from aforesaid reading means, plural toner image forming means which forms toner images on both sides of recording paper based on image information from the above-mentioned reading means or a storing means, a recording paper conveyance means which conveys a recording means, plural transfer means which transfers toner image on both sides of recording paper, a fixing means which heats collectively a recording paper in which toner images are formed on the above-mentioned both sides and fixes, a paper discharging means which discharges aforesaid recording paper outside the apparatus, a jamming detection means which detects jamming of recording paper conveyed by means of the above-mentioned recording paper conveyance means, a copying set number setting means, a paper discharging means which informs paper discharging of the above-mentioned recording paper, a displaying means which informs the occurrence of jamming based on detection information of the above-mentioned jamming detection means and a copying control means which controls all of the above-mentioned means based on copying starting operation, wherein, when jamming detection information is inputted from the above-mentioned jamming detection means, image formation onto the first recording paper based on copying resumption operation thereafter is conducted based on image information for both sides which has been recorded onto a jammed paper stored in the above-mentioned storing means or which was planned to be recorded and, when plural copying sets are set in the above-mentioned copying set number setting means, the above-mentioned storing means stores image information for both sides until the number of discharging recording paper detected by above-mentioned discharging detection means reaches the set number set in the above-mentioned copying set number setting means, images onto the recording paper for the second sheet and thereafter are formed based on image information stored in the above-mentioned storing means and the above-mentioned storing means stores image information for both sides until the number of discharging recording paper detected by above-mentioned discharging detection means reaches the set number set in the above-mentioned copying set number setting means.

Namely, in a control method of the above-mentioned image forming apparatus, double-sided image information onto the first recording paper after copying is resumed after jammed paper was removed is conducted based on image information stored by a storing means which has already recorded images on the jammed paper or which planned to record images on the jammed paper. Images are recorded based on image information from temporary storing by a storing means until discharging of the final recording paper of the copying set is detected by discharging detection means. Therefore, it is not necessary to return the document in which images were recorded on the jammed paper to the document starting position.

BRIEF DESCRIPTION OF THE DRAWINGS

FIG. 9 shows an operation timing graph of each section of an image forming apparatus when copying set number is two.

DETAILED DESCRIPTION OF THE PREFERRED EMBODIMENT

Hereinafter, the embodiment of the present invention will be explained. Description of the following sentences does not limit technical scope or meaning of the terminology of Claims. In addition, definitive explanation of the embodiment of the present invention exhibits the best mode, and limits neither the meaning of terminology of the present invention nor the technical scope.

(Embodiment 1)

Figure 1:
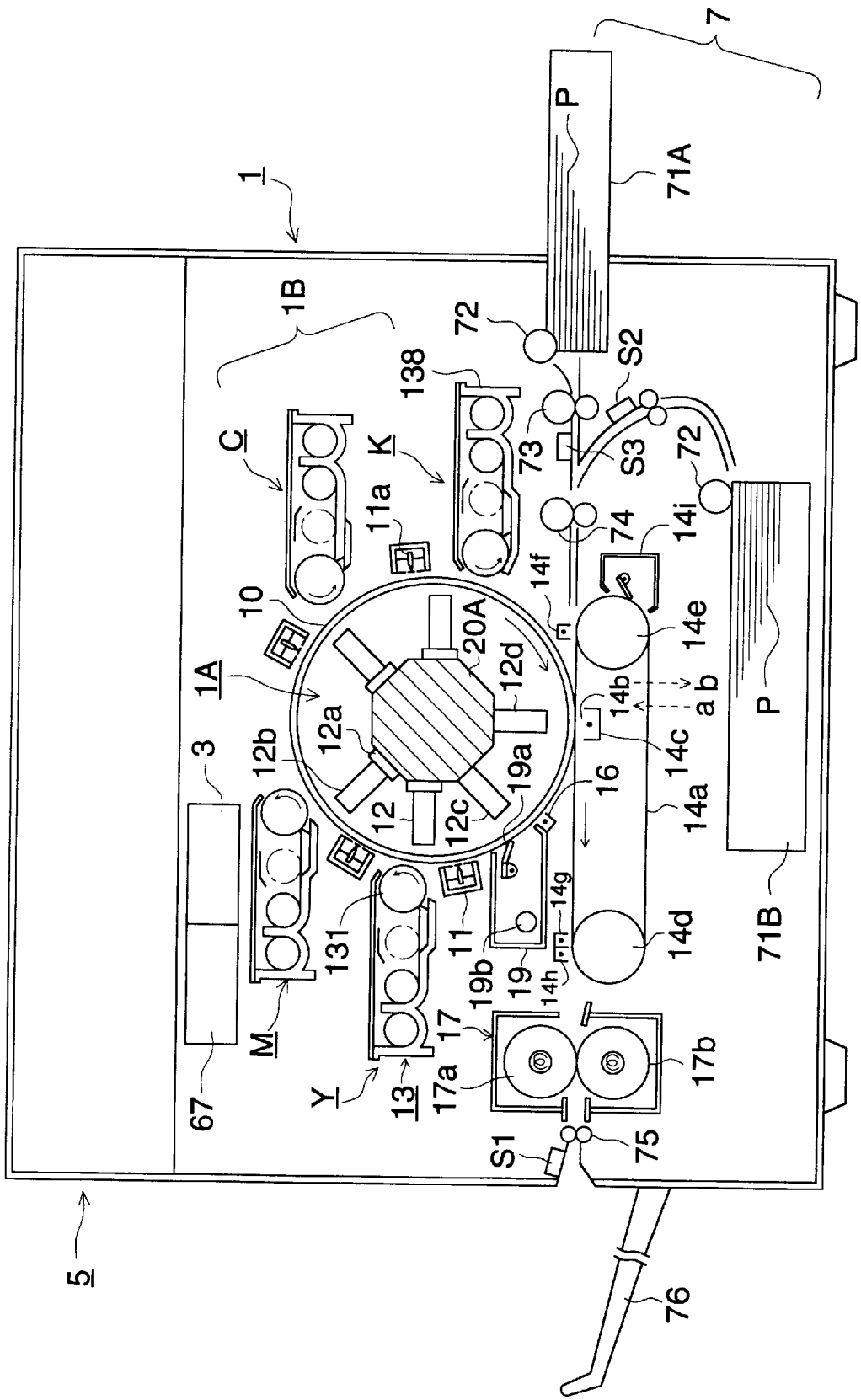
FIG. 1 shows a cross sectional view of the first embodiment of an image forming apparatus of the present invention.
Figure 2:
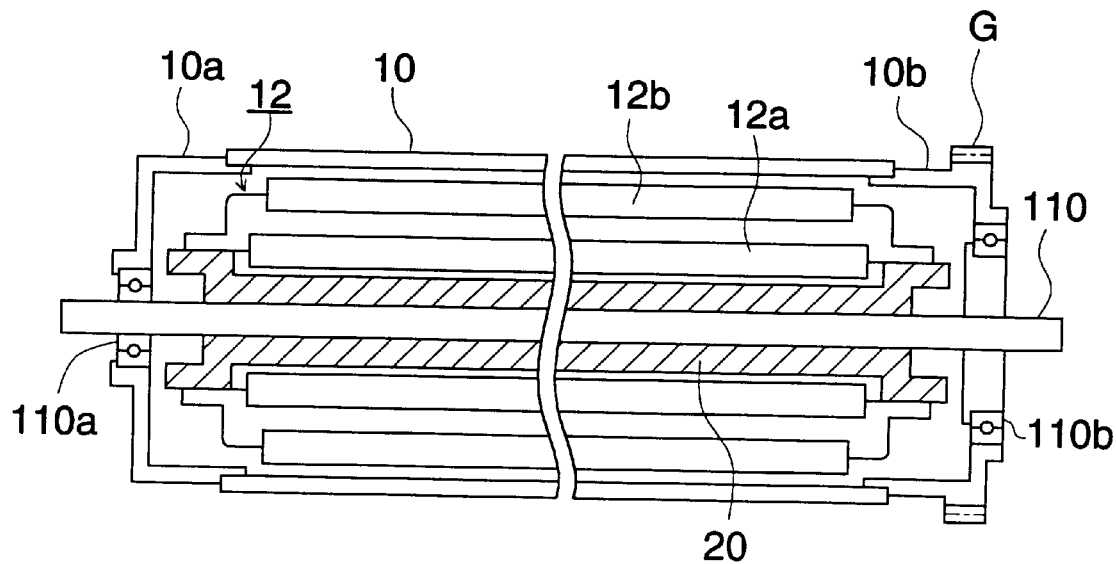
FIG. 2 shows side cross sectional view of an image carrier in FIG. 1.
Figure 3:
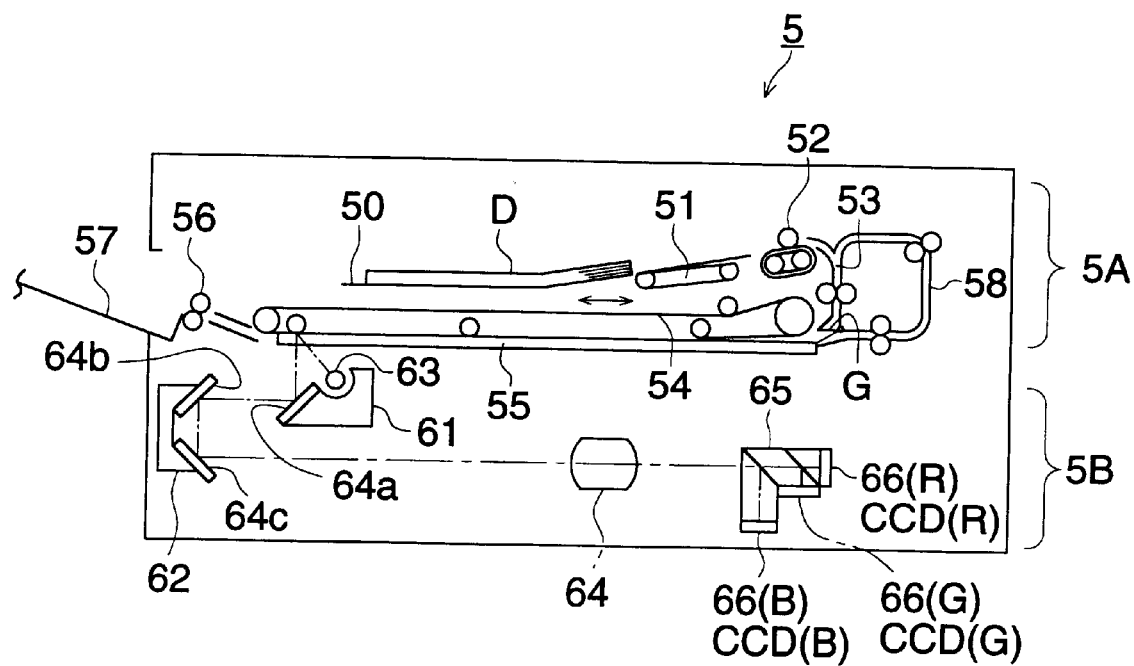
FIG. 3 is a cross sectional view showing a constitution of an image reading device in FIG. 1.
Figure 4:
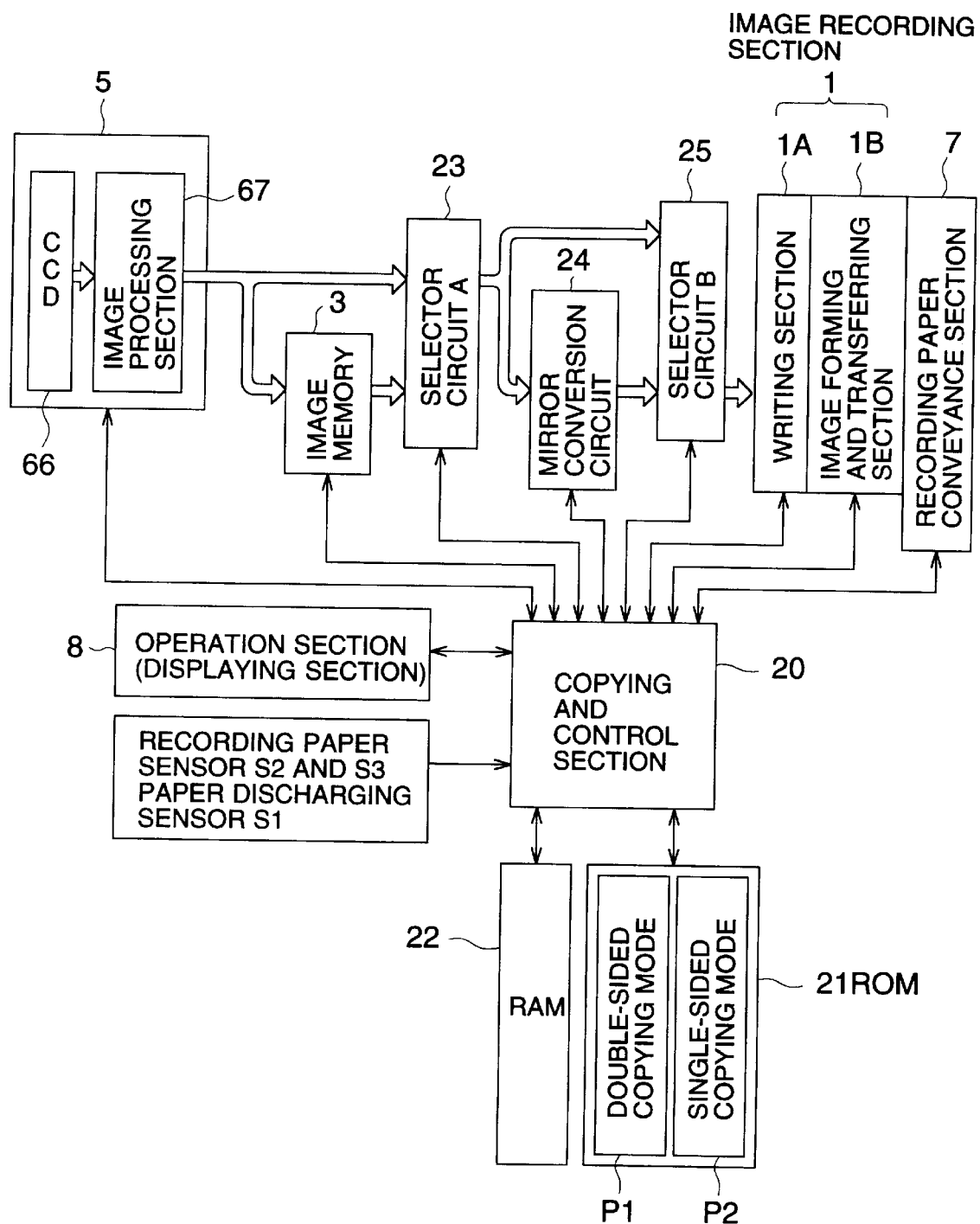
FIG. 4 is a block diagram showing a control system of the first embodiment.
Figure 5:
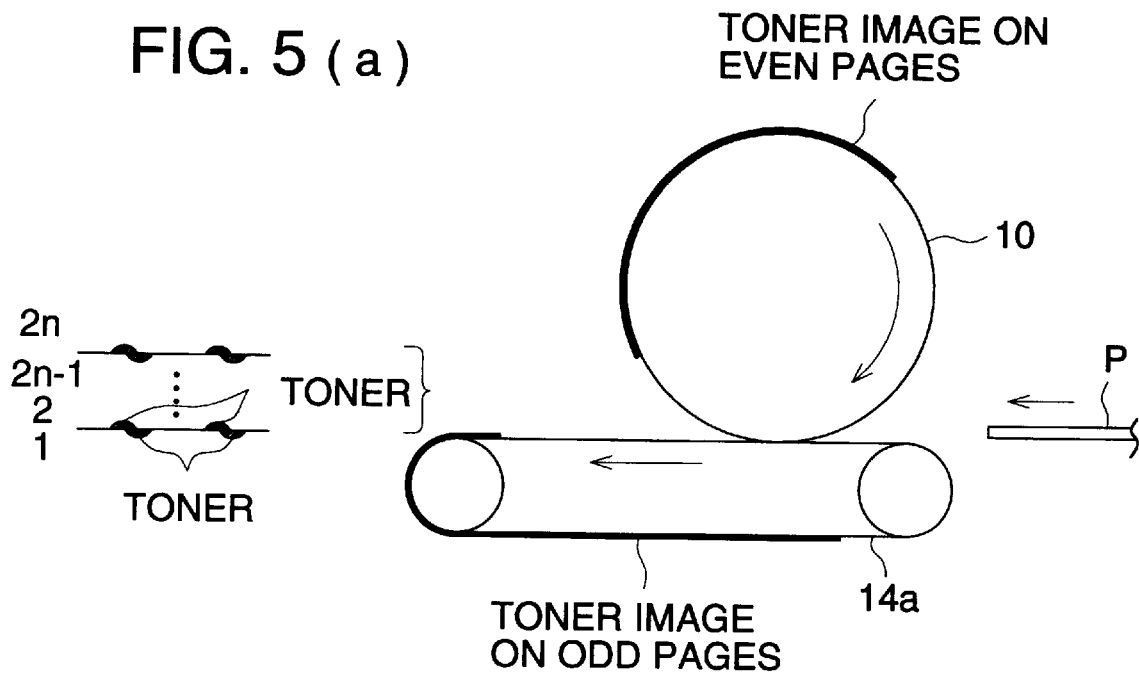
FIGS. 5(a) and 5(b) are illustrations showing formation status of double-sided toner.
Figure 5:
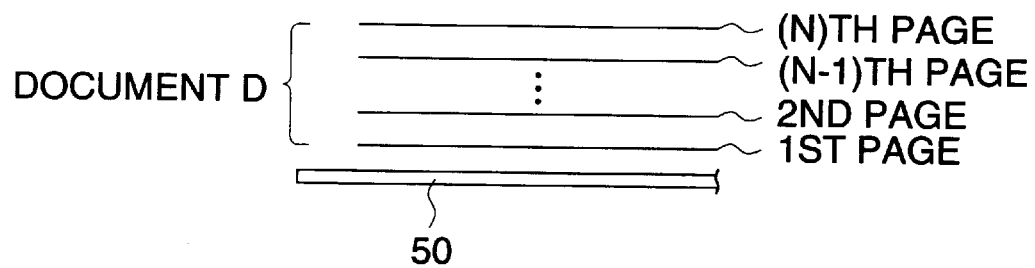
Figure 6:
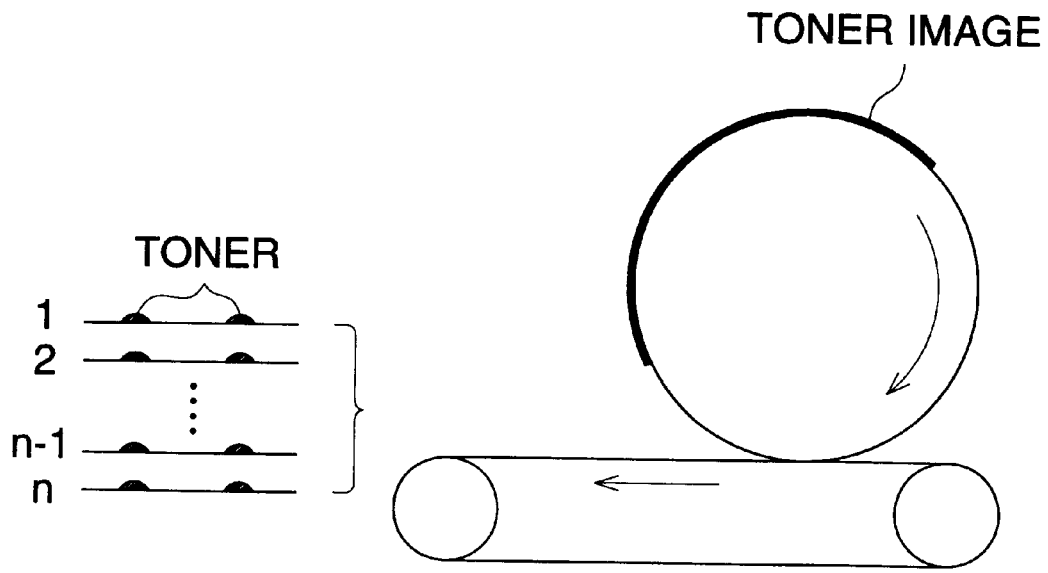
FIGS. 6(a) and 6(b) are illustrations showing formation status of a single-sided toner image.
Figure 6:
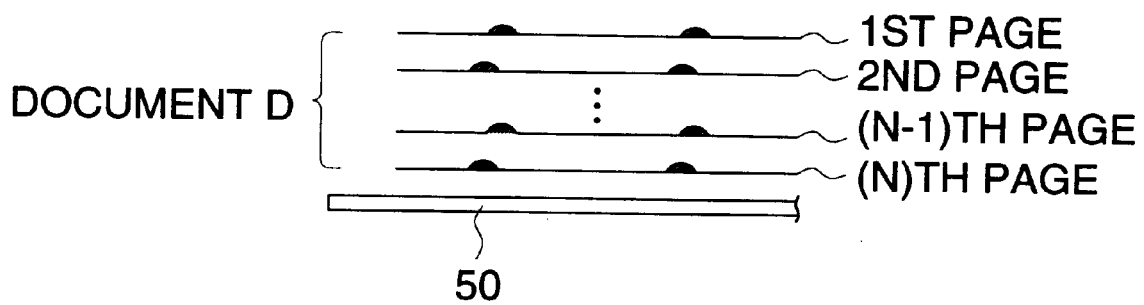
Figure 7:
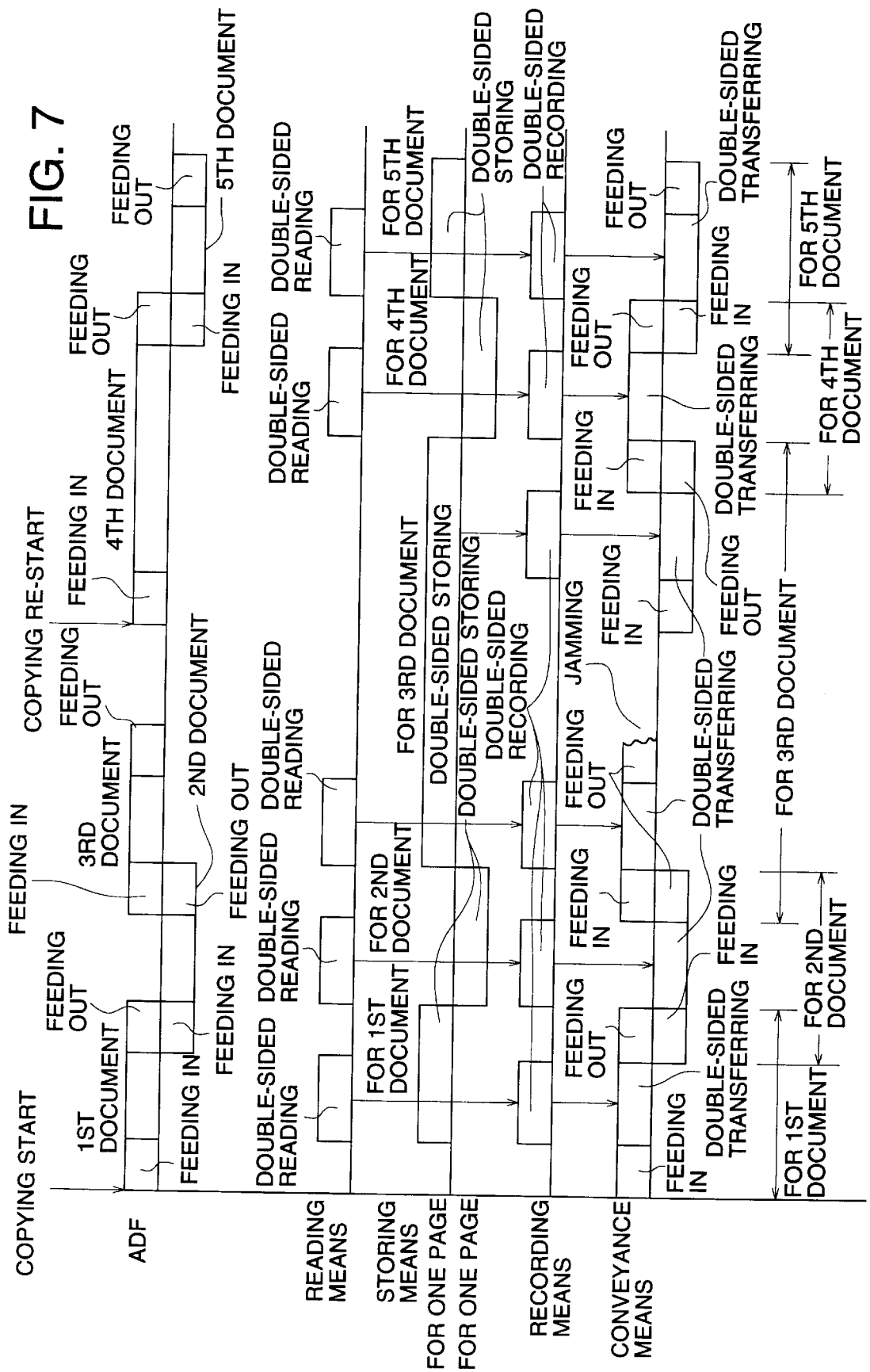
FIG. 7 shows an operation timing graph of each section of an image forming apparatus when copying set number is one.

Overall and individual mechanisms of an image forming process of the first embodiment of an image forming apparatus of the present invention will be explained employing a color double-sided image forming apparatus of FIGS. 1 through 7. FIG. 1 shows a cross sectional view of a color double-sided image forming apparatus of the first embodiment of an image forming apparatus of the present invention. FIG. 2 shows a cross sectional side view of an image carrier of FIG. 1. FIG. 3 is a cross sectional view showing one example of an image reading device in FIG. 1. FIG. 4 is a block circuit diagram showing an example of a control system of the image forming apparatus in FIG. 1. FIGS. 5(a) and (b) and FIGS. 6(a) and (b) are drawings respectively showing toner formation status in the case of double-sided copying and single-sided copying. FIG. 7 shows a timing graph of operation of each section in the image forming apparatus when one set of documents are copied.

An image forming apparatus of FIG. 1 is provided with document conveyance section 5A which is an document conveyance means (ADF) operating automatically, document reading device 5 which is a reading means composed of scanning optical type document reading means 5B and image processing section 67, image memory 3 which is a storing means, image recording section composed of writing section 1A and image formation transfer section 1B having a toner image formation means, transfer means, a separation means, a fixing means and a cleaning means. In addition, it is constituted of transfer paper conveyance section and is provided with a selection means which selects the double-sided copy mode and the single-sided copy mode.

In a color double-sided image forming apparatus of Embodiment 1, image data which is image information of an document for each color is read by document reading device 5 provided above the apparatus main body of FIG. 1.

First, reading of an document will be explained.

In document reading device 5 in FIG. 3, documents D to be copied are stacked on document loading stand 50 from the lower side as page proceed while the front surfaces face downward. Due to operation of conveyance rollers 51 and fanning rollers 52, document D at the lowermost layer is conveyed to conveyance path 53 individually.

Conveyed document D removes guide tray G biased to a position exhibited by a continuous line to a position exhibited by a dashed line. Aforesaid document is fed onto a transparent platen glass 55 through conveyance belt 54. Aforesaid document temporarily stops at an document reading position while the front surface faces downward.

The surface image on document D on platen glass 55 is subjected to photo-scanning by means of illuminating and reading operation of first mirror unit 61 composed of illuminance lamp 63 constituting document reading section 5B and first mirror 64a at the speed of V and by means of movement of angled second mirror unit 62 in the identical direction as the movement of first mirror unit 61 at the speed of V/2. Aforesaid image is focused on three CCD line censors 66(B), 66(G) and 66(R) through dichroic prism 65 by means of image pickup lens 64. Image data which is image information of blue (B), green (G) and red (R) surface image focused on CCD line sensors 66(B), 66(G) and 66(R) after being subjected to color separation by dichronic prism 65 is converted to a digital signal by means of an analogue/digital conversion at image processing section 67. Following this, aforesaid signal is subjected to image processing such as a illuminance/density conversion, a filter processing, an expansion/reduction processing and a γ conversion and to conversion processing to image data of each color of yellow (Y), magenta (M), cyan (C) and black (B). Image data subjected to conversion processing is outputted to each exposure unit 12 in writing section 1A as an electrical signal by means of a control by copying control section 20 so that image formation for the first page is conducted on photoreceptor drum 10. Aforesaid image data are temporarily stored and housed in image memory 3 which is a storing means in FIG. 4.

If double-sided copying mode is selected and reading and forming images on double sides are conducted in document reading device 5, when image recording for the surface image (an image on the first page) for the first page of document D is finished, the head and the reverse of the document is reversed by means of a temporary reverse rotation of conveyance belt 54 through reversal paper feeding path 58 by means of control of copying control section 20, and then aforesaid document is fed onto platen glass 55 through conveyance belt 54 after passing conveyance path 53. Aforesaid document temporarily stops at an document reading position while the second page faces downward.

The image on the reverse surface (image on the second page) of document D located on platen glass 55 is read by the above-mentioned document reading section 5B, and then aforesaid image is subjected to the above-mentioned image processing in image processing section 67 in FIG. 4. Following this, image formation for the second page is conducted on photoreceptor drum 10. Image data on the second page is stored and housed in image memory 3 in the same manner as image data on the first page. Document D in which reading of double-sided image has been finished is discharged onto discharging tray 57.

When one-sided copying mode is selected and reading and forming of an image on one-side is conducted, an image on one side of document D on platen glass 55 is read by the above-mentioned document reading section 5B and aforesaid image is subjected to image processing by means of image processing section 67. Following this, aforesaid image is formed on photoreceptor drum 10. Aforesaid one-sided image data is stored and housed in image memory 3. Document D in which reading of one-sided image is finished is discharged onto discharging tray 57.

FIG. 4 is a block diagram showing a control system of the present embodiment. In FIG. 4, numeral 5 represents the above-mentioned document reading device, numeral 8 represents a copy control section having a key for designating either double-sided mode or a single-sided mode, a copy start button and a display section, numeral 20 represents a copy control section using a micro-computer which controls the entire image forming apparatus, numeral 21 represents an ROM which houses an image forming process program of each mode. Numeral 22 represents an RAM housed in copy control section 20. 23 represents a selector circuit A which selects one from image data directly sent from image processing section 67 or image data read from image memory 3 and sends it to the following circuit. 24 represents a mirror conversion circuit which converts image data for forming a mirror image. 25 represents selector circuit B which selects one from image data sent from selector circuit A23 or image data sent from mirror conversion circuit 24 and to sends it to writing section 1A.

Image memory has storage capacity for at least one sheet (2 pages) of document. When the double-sided copy mode is selected, image formation for the front surface and the rear surface is conducted on the first recording medium. Simultaneously with this, image data on the front surface and the rear surface are stored in image memory 3. Image data read by document reading section 5B is outputted to each exposure unit 12 of writing section 1A through selector circuit A23, mirror circuit 24 and selector circuit B25.

Based on image data read due to aforesaid process, an image on odd page of document D (the front surface image) or an image on even page surface (rear surface image) is formed on photoreceptor drum. 10. Aforesaid images are transferred on the front surface and the rear surface of the first recording medium P fed from paper feeding cassette 71A or 71A. Thus, copying cycle for the first page is finished. Recording medium P on which toner image is carried on the front surface and the rear surface is collectively fixed by a fixing device 17. Aforesaid recording medium is discharged on tray 22 located out of the apparatus. Aforesaid recording medium is stacked on a recording medium discharged in advance in paper order.

Image data on the front surface and the rear surface stored in image memory 3 is erased due to the control of copy control section 20 by means of information about judgment that recording medium P on which toner image formed based on aforesaid image data has been transferred and fixed has been discharged to out of the machine.

In image reading device 5, document D in which image reading has been finished is discharged onto tray 57 through discharging roller 56 due to the movement of conveyance belt 54.

In accordance with a copy mode instructed and set in operation section 8 in FIG. 4, by selecting an image forming method of a color double-sided image forming apparatus, i.e., either a double-sided copy mode or a single-sided copy mode, one copy mode selected from either program P1 which corresponds to the double-sided copy mode housed in ROM 21 through copy control section 20 or program P2 which corresponds to the single-sided copy mode is called in RAM 22. Control of the process of a color double-sided image forming apparatus as shown in FIG. 1 and execution are conducted.

Next, constitution of a color double-sided image forming apparatus in FIG. 1 and a color image forming method by means of a double-sided copy mode will be explained.

Toner image receiving body 14a described later is rotated in a dashed line arrowed direction a with the shaft of driving roller 14d as the center as shown in FIG. 1. The following image formation is conducted while aforesaid toner image receiving body 14a is separated from photoreceptor drum 10.

Photoreceptor drum 10, which is an image carrier, comprises a cylindrical substrate formed by a transparent member such as glass or transparent acrylic resin and provided thereon with a transparent conductive layer and a photosensitive layer such as an a-Si layer or an organic photosensitive layer (OPC) on the circumference of aforesaid substrate.

As shown in FIG. 2, photoreceptor drum 10 is sandwiched by front flange 10a and rear flange 10b. Front flange 10a and rear flange 10b are respectively provided on fixed shaft 110 through rollers 110a and 110b. Gear G provided on the circumference of rear flange 10b is engaged with a gear for driving (not illustrated). Due to force therefrom, photoreceptor drum 10 is rotated clockwisely as shown by an arrow in FIG. 1 while the transparent conductive layer is grounded.

In the present embodiment, the photoconductive layer on the photoreceptor drum may have exposure light amount capable of providing a suitable contrast. Therefore, light transmissive ratio of the transparent substrate of the photoreceptor drum in the present embodiment is not necessarily be 100%. It is allowed that a certain extent of light may be absorbed when exposed light transmits. As a material for a translucent substrate, those employ acrylic resin, specifically methacrylic acid methylester monomer for polymerization are excellent in terms of transparency, strength, accuracy and surface property. In addition, various translucent resins such as acrylic resin, fluoride resin, polyester resin, polycarbonate resin and polyethylene terephthalate resin which are ordinarily used for optical members are usable. They may be colored if they have translucency on exposed light. As a translucent conductive layer, indium tin oxide (ITO), tin oxide, lead oxide, indium oxide and copper iodide and metallic thin membrane composed of Au, Ag, Ni and Al which maintain translucency are used. As a casting method, a vacuum depositing method, an active reaction depositing method, each spattering method, each CVD method, a dip coating method and a spray coating method are utilized. As a photoconductive layer, an amorphous silicon (a-Si) alloy photosensitive layer, an amorphous selenium alloy photosensitive layer and each organic photosensitive layer (OPC) can be used.

Scorotron chargers 11, used as charging means, are used for image forming process for each of yellow (Y), magenta (M), cyan (C) and black (K). Aforesaid scorotron chargers are mounted in a direction perpendicular to photoreceptor drum 10, which is an image carrier, facing photoreceptor drum 10. By the use of a control grid kept at a prescribed potential against the above-mentioned organic photosensitive layer in photoreceptor drum 10 and a saw-tooth-shaped electrode, by means of corona discharge having the same polarity as the toner, charging is conducted (in the present embodiment, negative charge), giving uniform potential to photoreceptor drum 10. As a discharging electrode 11a, a wire electrode may be used.

Exposure position of exposure units 12, as an image exposure means for each color, are located between discharging electrode 11a of scorotron charger 11 and developing position of developing device 13 and upstream in the rotation of photoreceptor drum 13 compared with developing sleeve 131.

In exposure unit 12, bar-shaped exposure element 12a, in which several LED (light emission diode) as an image exposure light emission element arranged in a primary scanning direction parallel to shaft 110 of photoreceptor drum 10 in an array state, and Selfoc lens 12b, as a life size focusing element, are mounted on holder 12c. On cylindrical or prism-shaped retention member 20 provided integral to the apparatus main body, exposure unit 12, uniform exposure device 12C and exposure device 12D which functions simultaneously with transferring are mounted and housed in a substrate of photoreceptor drum 10.

As an exposure element, plural light emission elements such as FL (fluorescent light emitter), EL (electroluminescence), PL (plasma discharger) and LED (light emission diode), which are aligned array shape for forming a bar-shape, are used. The range of light emission wavelength of light emission element used in the present embodiment is preferably 680–900 nm in which transmissivity of Y, M and C toners are ordinarily high. However, in this case, since image exposure is conducted from the rear surface, wavelength shorter than aforesaid wavelength range which has not sufficient transparency on color toner.

Each developing device is provided in accordance with the order of color formation in which images are formed. In the present embodiment, based on photoreceptor drum 10, Y and M developing devices 13 are located at the left side of aforesaid photoreceptor drum 10. C and K developing devices 13 are located at the left side of aforesaid photoreceptor drum 10. Y and M scorotron chargers 11 are located above of developing casing 138. C and K scorotron chargers 11 are located at the below of aforesaid developing casing 138.

Developing devices, which are developing means for each color, respectively house yellow (Y), magenta (M), cyan (C) and black (K) one-component or two-component developers. Aforesaid developing devices respectively provided a developing sleeve, formed by a cylindrical and un-magnetic material, made of stainless steel or aluminum, whose thickness is 0.5–1 mm and whose outer-diameter is 15–25 mm rotate in the identical direction as that of photoreceptor drum 10 at the developing position, while keeping a prescribed gap with photoreceptor drum 10, respectively.

Each developing device is kept un-contact with photoreceptor drum 10 having gap of a prescribed value, for example, 100–1000 μm, due to a pushing roller (not illustrated). When conducting developing operation by means of developing devices 13 for each color, development bias voltage (D.C. voltage or A.C. voltage was added to D.C. voltage) is impressed and, thereby jumping development by means of a one-component or two-component developer housed in developing device 13. Bias voltage in which A.C. voltage was superimposed on D.C. bias voltage having the same polarity as toner (in the present embodiment, a negative polarity) was impressed to photoreceptor drum 10 having a negative load in which a transparent conductive layer is grounded.

Each of the above-mentioned developing device 13 reversally develops electro-static latent image, on photoreceptor drum 10, formed by means of charging due to the above-mentioned scorotron charger 11 and image exposure due to exposure units 12 by the use of toner having the same polarity as charge polarity (in the present embodiment, photoreceptor drum 10 is negatively charged, therefore toner is negative polarity) under non-contact status by means of a non-contact developing method in which the above-mentioned development bias voltage is impressed.

When copying (image recording) is started due to depressing of copying starting button in operation section 8, toner image receiving body 14a (described later) is rotated in a direction shown by a dot arrow a with the shaft of driving roller 14d as the center. While aforesaid toner image receiving body is separated from photoreceptor drum 10, the photoreceptor driving motor (not illustrated) starts so that gear G provided on rear flange 10b on photoreceptor drum 10 is actuated through a gear for driving. Photoreceptor drum rotates clockwise in an arrowed direction as shown in FIG. 1. Simultaneously, provision of potential is started to photoreceptor drum 10 due to charging effect of Y scorotron charger 11 located upstream of developing casing of yellow (Y) developing device 13 at the left side of photoreceptor drum 10.

Simultaneously, in image reading device 5, insertion of document D into a document reading position is started. Image information on the surface (1st page) read from an image of document D which has stopped at the reading position is subjected to image processing to produce image data for Y, M, C and K colors. Aforesaid image data are directly inputted to exposure unit 12 as an electrical signal in such a manner that the image is exposed on a portion where the above-mentioned potential is provided. Simultaneously with this, image data for each color are temporarily stored in image memory 3.

Namely, after potential was provided on photoreceptor drum 10, in Y exposure unit 12, exposure by means of an electrical signal which corresponds to the first color signal, i.e., Y image data starts. Due to rotation scanning by the drum, an electro-static latent image which corresponds to Y image of document image on the photosensitive layer on the surface of the photoreceptor drum.

By means of Y developing device 13, the above-mentioned latent image is reversally developed while a developer on the development sleeve is in uncontact. In accordance with the rotation of photoreceptor drum 10, yellow (Y) toner image is formed.

Next, potential was provided on the above-mentioned yellow toner image on photoreceptor drum 10 due to charging operation by magenta (M) scorotron charger 11 located at the left side of photoreceptor drum 10, downstream of yellow (Y) developing device and upstream of developing casing 138 of magenta (M) developing device 13. Exposure by means of the second color signal, i.e., M image data, in M exposure unit 12 is conducted. Due to un-contact reversal development by means of M developing device 13, magenta (M) toner image is successively formed on the above-mentioned yellow (Y) toner image.

Cyan (C) toner image corresponding to the third color signal is formed on aforesaid yellow (Y) toner image due to cyan (C) scorotron charger 11 located at the right of photoreceptor drum 10 and above developing casing 138 of developing device 13, C exposure unit 12 and C developing device 13, and then black (K) toner image corresponding to the fourth color signal is formed on aforesaid cyan (C) toner image due to black (K) scorotron charger 11 located at the right of photoreceptor drum 10 and below developing casing 138 of developing device 13, K exposure unit 12 and K developing device 13. Thus, within one rotation of photoreceptor drum 10, color toner image is formed on the circumference thereof.

Exposure on the organic photosensitive layer by means of the above-mentioned Y, M, C and K exposure units 12 is conducted from inside of the drum through the above-mentioned transparent substrate. Accordingly, exposure of images corresponding to the second, third and fourth color signals does not receive influence from toner images formed in advance. Therefore, electro-static latent image identical to that of an image corresponding to the first color image can be formed. Due to heating of each exposure optical system 12, temperature inside photoreceptor drum 10 may rise. In order to stabilize temperature and prevent rise of temperature, materials having favorable heat transmissivity are used for the above-mentioned retention member 20, and a heater or a heat pipe is provided inside aforesaid retention member 20A. When the temperature is too low, a heat is used. When the temperature is too high, a heat pipe is used for releasing heat to outside the apparatus. Due to this, temperature can be inhibited so as not to cause trouble.

Next, toner image receiving body 14a is rotated in a dot arrow b with driving roller 14d as the center, and then is brought into contact with photoreceptor drum 10.

On the above-mentioned photoreceptor drum 10 (the first image carrier means), a color toner image, in which toner images are superposed, which will be an image on the first page is formed. The color toner image, which is an image for the first page, on photoreceptor drum 10 is collectively transferred on toner image receiving body 14a (the second image carrier means) by means of transfer device 14c in which voltage having an opposite polarity (in the present embodiment, a positive polarity) is impressed in transfer area 14b. In this occasion, in order to provide favorable transfer, uniform exposure by means of transfer-simultaneous-exposure device 12d is conducted using a light emission diode.

After the transfer, toner remained on the circumference of photoreceptor drum 10 is subjected to charge-eliminating by means of image carrier AC charge-eliminator 16. Following this, aforesaid toner is moved to cleaning device 19, where it is scraped out into cleaning device 19 by means of cleaning blade 19a composed of rubber material which is brought into contact with photoreceptor drum 10. By means of screw 19b, aforesaid toner is collected by a container for discharged toner (not illustrated).

In order to remove after-effect of the photoreceptor up to the former copying, charge on the photoreceptor from which remaining toner is removed by means of uniform exposure device 12c in which a light emission diode is employed.

Toner image receiving body 14a is rotated in a direction shown by dot arrow "b" in FIG. 1 with the shaft of driving roller 14d as the center, again. While aforesaid toner image receiving body 14a is separated from photoreceptor drum 10, an image on the second page, which is an image of an even page of the first sheet of a superposed color toner image, is formed on photoreceptor drum 10, being with an image on the first page formed on aforesaid toner image receiving body 14a. With regard to an image on the second page, it is necessary to modify image data in such a manner that the image on the second page forms a mirror with an image on the first page. Image data subjected to mirror conversion by means of mirror conversion circuit 24 due to copying control section 20 is sent to writing section 1A through selector circuit B25.

When an image on the second page is formed, toner image receiving body 14a is rotated in a direction shown by dot arrow "a" with the shaft of driving roller 14d as the center so that it is brought into contact with photoreceptor drum 10.

Recording paper P having a size designated by operation section 8 is fed from paper feeding cassette 71A or 71B due to control by copying control section 20, and is conveyed to timing roller 74 through feeding roller 73.

Recording paper P is fed to transfer area 14b due to driving of timing roller 74, while the color toner image for the second page carried on photoreceptor drum 10 is synchronized with the color toner image for the first page carried on toner image receiving body 14a. Recording paper P is charged to the polarity the same as the toner by means of paper charger 14f. Recording paper P is adsorbed by toner image receiving body 14a to be fed to transfer area 14b. By providing paper charging at the same polarity as toner, to pull with the toner image on toner image receiving body 14a or photoreceptor drum 10 each other is prevented, and thereby preventing the disturbance of the toner image.

By means of transfer device 14c which is the first transfer means on which voltage having the opposite polarity (in the present embodiment, a positive polarity) is impressed, images on the second page on the circumference of photoreceptor drum 10 are collectively transferred onto the upper surface of recording paper P. Here, the images for the first page on the circumference of toner image receiving body are not transferred onto recording paper P, remaining on aforesaid toner image receiving body 14a. By means of rear-surface transfer device 14g which is the second transfer means on which voltage having the opposite polarity (in the present embodiment, a positive polarity) is impressed, images on the first page on the circumference of toner image receiving body 14a are collectively transferred onto the lower surface of recording paper P. When transferring using transfer device 14c, in order to complete favorable transferring, uniform exposure, by the use of transfer-simultaneous-exposure device 12d using a light emission diode provided inside photoreceptor drum 10, which faces transfer device 14c, is conducted.

Since toner image for each color are superposed each other, in order to realize collective transfer, it is preferable that the toner on the upper layer(s) and that on the lower layer(s) are charged with the same charge amount and to the same polarity. Accordingly, in the case of double-sided image formation in which the color toner image formed on toner image receiving body 14a is subjected to inversion by means of corona discharge or in which the color toner image formed on the image carrier is subjected to inversion by means of corona discharge, toners on the lower layer(s) are not sufficiently charged so that transfer becomes insufficient.

To repeat reversal development on the image carrier, to collectively transfer color toner image in which toners having the same polarity are superposed for forming color toner onto toner image receiving body 14a without changing polarity and to collectively transfer aforesaid color toner image onto recording paper P without changing the polarity is preferable since it contributes to improvement of transfer property of image formation for the first page. For image formation for the second page, to repeat reversal development on the image carrier and to collectively transfer color toner image in which toners having the same polarity are superposed for forming color toner onto toner image receiving body 14a without changing polarity is preferable since it contributes to improvement of transfer property of image formation.

In the present image formation, a double-sided image formation method in which a color toner image is formed on the front surface of recording paper P by operating the first transfer means and a color toner image is formed on the rear surface of recording paper P by operating the second transfer means using the image forming method for the front surface and the rear surface for the above-mentioned recording paper P is preferably adopted.

Toner image receiving body 14a is made of an endless rubber belt having a thickness of 0.5–2.0 mm, composed of a silicone rubber or a urethane rubber semi-conductor substrate having a resistance value of $10^8$–$10^{12}$ $\Omega$ cm and provided thereon with a fluorine-coated anti-toner-filming layer having thickness of 5–50 $\mu$m. It is preferable that the upper layer also has similar semi-conductivity. In place of a rubber belt substrate, semi-conductive 0.1–0.5 mm width polyester, polystyrene, polyethylene and polyethylene terephthalate may be used.

Charge on recording paper P in which color toner images are formed on both surface is eliminated by means of paper separation AC charge-eliminator 14h as transfer separation use. Aforesaid recording paper P is separated from toner image receiving body 14a, and then conveyed to fixing device 17, as a fixing means, constituted on two rollers each having a heater inside both rollers. Between fixing roller 17a and pressure roller 17b, heat and pressure are applied. Due to this, adhered toners on the front surface and the rear surface of recording paper P are fixed. Aforesaid recording paper P (copy) in which images have been recorded on both surfaces is discharged to tray 76 outside apparatus.

The toner remained on the circumference of toner image receiving body 14a after transferring is subjected to cleaning by means of toner image receiving body cleaning device 14i. Toner remained on the circumference of photoreceptor drum 10 after transferring is subjected to charge-elimination by means of image carrier AC charge-eliminator 16. Following this, aforesaid toner moves to cleaning device 19, where aforesaid toner is scraped out into cleaning device 19 by cleaning blade 19a composed of rubber material which is brought into contact with photoreceptor drum 10 so that aforesaid toner is collected into a waster-toner container (not illustrated) by screw 19b. Photoreceptor drum 10 on which remaining toner is removed by means of cleaning device 19 is subjected to uniform charging by means of scorotron charger 11, and toner image receiving body 14a is rotated in a direction shown by dot arrow "a" in FIG. 1 with the shaft of driving roller 14d as the center, and then enters into the next image forming cycle while aforesaid toner image receiving body 14a is separated from photoreceptor drum 10.

The above-mentioned procedure shows a method of images forming on one sheet in a double-sided mode. When plural number of sheets, for example, n sheets are copied in the double-sided copying mode, as shown in FIG. 5(a), a color toner image on an even page formed on photoreceptor drum 10 and a color toner image on an odd page formed on toner image receiving body 14a are transferred on the front side and the rear side of recording paper P for producing a double-sided image. As shown in FIG. 5(b), the first sheet of double-sided copy is discharged on which the first page faces downward. The second sheet of copy is stacked on the first page copy. The final sheet of copy is stacked on the uppermost surface with (2n)th page toner image surface facing upward. Due to this, if documents D are stacked as page proceed from the bottom while the surface faces downward on document loading stand 50 of image reading device 5, copied recording papers P (copy) are stacked as pages proceed from the bottom while the surface faces downward.

In the case of color image formation in the single-sided copy mode, simultaneously as reading a single-sided image, images on one side is formed. In image memory 3, image data on one side are stored. When forming an image on a single-sided mode, a method to transfer and fix toner image carried on photoreceptor drum 10 (the first image carrier means) onto recording paper P by means of the above-mentioned toner image forming means, and then discharge aforesaid recording paper P onto tray 76 located outside he apparatus while facing the toner image surface upward is simple. I this occasion, toner image is formed only on photo-receptor drum 10, but not formed on toner image receiving body 14a.

When plural number, for example, n number of cop is conducted by a single-sided copy mode, as shown in FIG. 6(a), the first sheet of copy is discharged on tray 76 with color toner image facing upward. On aforesaid paper, second sheet of copy is discharged, and finally, (n)th sheet of copy is discharged on the uppermost side with the color toner image surface facing upward. Accordingly, copied papers are stacked in the reversal page number order. Therefore, in aforesaid single-sided copy mode, as shown in FIG. 6(b), documents D are loaded on document loading stand 50 as pages proceeds while facing the image surface upward, image reading starts from the final page. The copied papers are discharged as pages proceed while the toner image faces upward. Therefore, control becomes easier.

If s paper discharge switching means is provided at the discharging port of copy and thereby the front side and the rear side of copy paper is reversed to be discharged in the case of a single-sided copy mode, it is possible to stack and discharged as pages proceed in the normal page number order, both in double-sided copying and single-sided copying.

In the present embodiment, paper discharge sensor S1, which is a paper discharging detection means which detects discharge of the recording paper is provided in the vicinity of the discharging port for recording paper P. Discharging of recording paper P is detected by the falling of a recording paper detection signal from paper discharging sensor S1. Receiving a discharging signal of recording paper P from paper discharging sensor S1, copy control section 20 causes image memory 3 to erase an image signal on an image recorded on recording paper P stored when reading the document image.

As jamming detection means covering along with the conveyance path from the recording paper feeding section in cassette 71A or 71B to the discharging port of the recording paper, recording paper sensors S2 and S3 which detect passing of the recording paper and the above-mentioned paper discharging sensor S1 are provided. Copying control section 20 measures time until recording paper sensor S2 or S3 detects recording paper P which has been started conveyance and time until recording paper P detected by recording paper sensor S2 or S3 is detected by paper discharging sensor S1. If the measured times are respectively a prescribed time or more, it is judged to be that jamming has occurred. Displaying that aforesaid problem has occurred is shown in the display section of operation section 8. Operation on the upstream of the sensor which has detected the jamming of recording paper P is immediately stopped. With regard to the downstream side, operation is stopped after recording paper P existing inside the apparatus is discharged to out of the apparatus. Together with this operation, copying control section 20 stops the operation when document D fed from document loading stand 50 is discharged to document receiver 57 for document conveyance section 5A, when reading sequence of document D located on platen glass 55 is finished for document reading section 5B, when reading operation for one image is finished for writing section 1A for image recording section 1 or when photoreceptor drum 10 rotates one rotation additionally after writing operation of writing section 1A is finished for image forming and transfer section 1B, respectively.

When the operator removes jamming paper from recording paper conveyance section 7 and resumes copying operation by depressing a copying starting button in operation section 8, as shown in FIG. 7, even if feeding of document D onto platen glass 55 is conducted by document conveyance section 5A, document reading section 5B does not read the document immediately. Image data of an image which was recorded on a jammed paper stored in storing means 3 or which was planned to be recorded are called to be inputted in writing section 1A. Based on aforesaid image data, image forming and transferring section 1B, in the same manner as above, forms a toner image on photoreceptor drum 10. Aforesaid toner image is transferred onto recording paper P fed as if it is brought into contact with photoreceptor drum 10 by a recording paper conveyance section 7 to be fixed. Aforesaid recording paper is discharged to outside the apparatus.

When paper discharging sensor S1 detects that recording paper P after copying operation is resumed has been discharged to outside the apparatus, copying control section 20 erases image data stored in storing means 3, reads the next document on platen glass 55, conducts copying in image recording section 1 based on image data and records image data read in the following document onto storing means 3.

Embodiment 2

Figure 8:
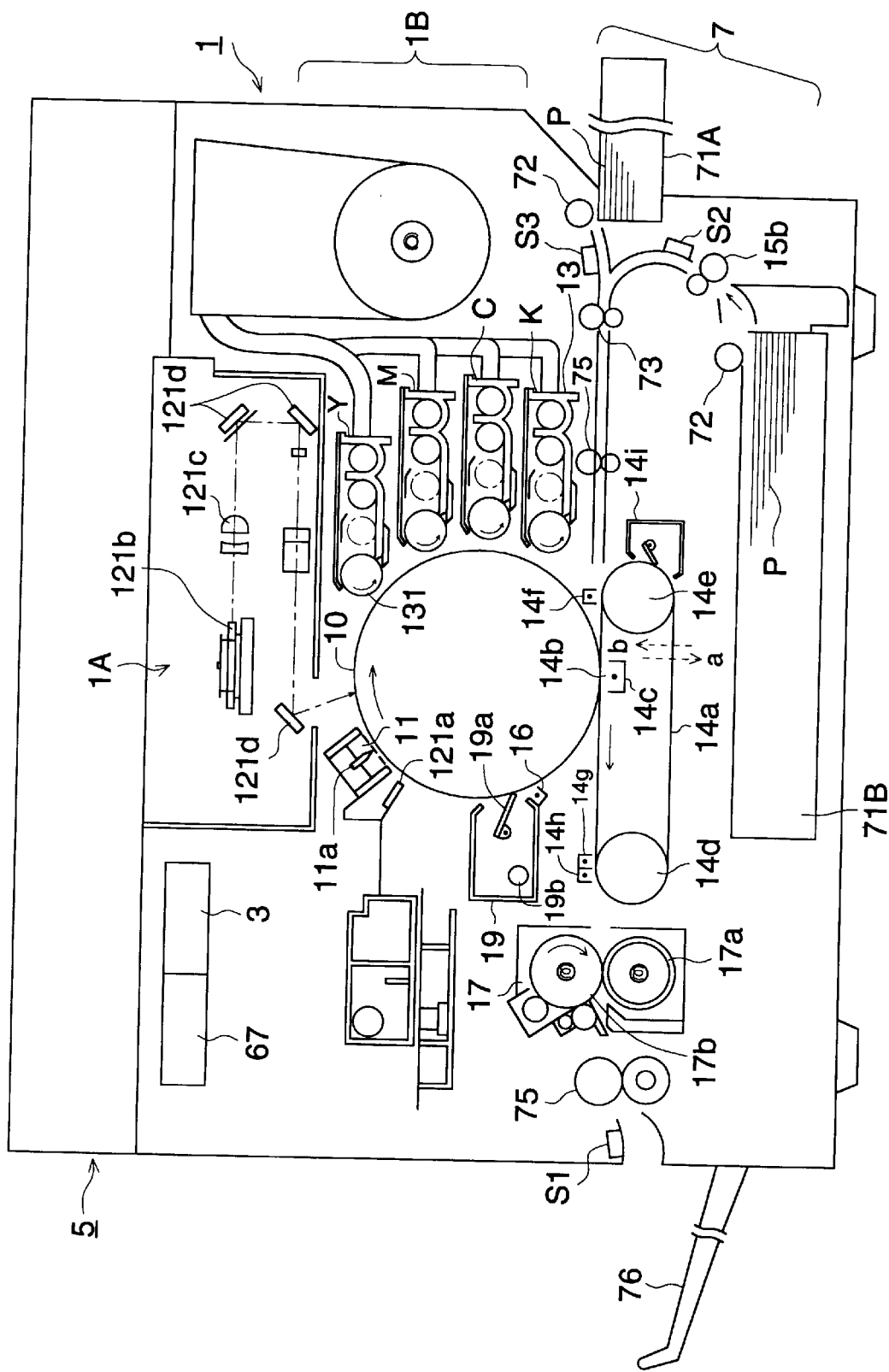
FIG. 8 shows a cross sectional view of the second embodiment of an image forming apparatus of the present invention.

Image forming process and each mechanism of the second embodiment of the double-sided image forming apparatus of the present invention will now be explained referring to FIGS. 8 and 9. FIG. 8 shows cross sectional view of a color double-sided image forming apparatus, which is a second embodiment of a double-sided image forming apparatus of the present invention. FIG. 9 shows an operation timing graph of each section of an apparatus when the number of copying is two in the second embodiment.

In the same manner as in the first embodiment, an image forming apparatus of the second embodiment is an image forming apparatus provided with an image reading apparatus above the apparatus. Aforesaid image forming apparatus employs a semi-conductor laser emission element for an exposure unit and is provided with a key for inputting number of copying in operation unit 8. By means of aforesaid key and copying control section 20, a copying number setting means is constituted. With regard to other sections, they have the same functions and structures as of: the first embodiment. Therefore, those members having the same function and the structure as the first embodiment are provided with the same numerals and detailed explanation is omitted.

Next, the constitution of a color double-sided image forming apparatus and a color image forming method as shown in FIG. 8 are explained.

Toner image forming body 14a bridged between driving roller 14d and driven roller 14e is rotated in a direction shown by dot arrow in FIG. 8 with the shaft of driving roller 14d as the center, and the following image formation procedure is conducted while aforesaid toner image receiving body 14a is separated from photoreceptor drum 10.

Photoreceptor drum 10, an image forming body, comprises a cylindrical substrate inside thereof and provided thereon with photosensitive layers such as a conductive layer, a-Si layer or an organic photosensitive layer (OPC). While being grounded, aforesaid photoreceptor drum 10 is rotated clockwise as shown by an arrow in FIG. 8.

Photoreceptor drum 10, as an image forming body, is driven to be rotated. After-effect of the photoreceptor up to the former copying, charge on the photoreceptor from which remaining toner is removed by means of uniform exposure device 121a, as a charge-elimination means, composed of a light emission diode is eliminated so that charge in previous printing is eliminated.

Scorotron chargers 11, used as charging means, provide charging effect by means of corona discharge having the same polarity as the toner by the use of a control grid kept at a prescribed potential against the above-mentioned organic photosensitive layer in photoreceptor drum 10 and a saw-tooth-shaped electrode, charging is conducted (in the present embodiment, negative charge), giving uniform potential to photoreceptor drum 10.

After the circumference of photoreceptor drum 10 is uniformly charged, image exposure is conducted by an image signal due to exposure unit 121 as an image exposure means so that a latent image is formed on photoreceptor drum 10.

Exposure unit 121, as an image exposure means in writing section 1A is composed of a semi-conductor laser as a light emission element (not illustrated), rotation polygonal mirror 121b which rotates and scans laser light emitted from a semi-conductor laser, fθ lens 121c and reflection mirror 121d. Laser beam emitted from the semi-conductor laser (no illustrated) is subjected to rotational scanning by means of polygonal mirror 121b. The resulting beam conducts image exposure based on image data in the primary scanning direction parallel to the rotation axis of photoreceptor drum 10 which rotates through fθ lens 121c and reflection mirror 121d. In addition, due to secondary scanning of the rotation of photoreceptor drum 10, a latent image is formed on photoreceptor drum 10 due to secondary scanning by the rotation of photoreceptor drum 10.

On the circumference of photoreceptor drum 10, developing devices 13 for each color respectively containing a developer composed of yellow (Y), magenta (M), cyan (C) and black (K) toner and carrier are provided. In the same manner as in the first embodiment, first, development for the first color (for example, yellow) is conducted by development sleeve 131.

Following above, on the above-mentioned yellow (Y) toner image on photoreceptor drum 10, magenta toner image which corresponds to the second color signal, cyan (C) toner image which corresponds to the third color signal and black (K) toner image which corresponds to the fourth color signal are superposed to be formed during plural rotations.

Image forming and transfer section 1B is provide d with chargers 11 which uniformly charge photoreceptor drum 10, developing devices 13, first transfer device 14c, rear surface transfer device 14g which is the second transfer device, eliminator 14h which is a paper separation AC charge-eliminator, fixing device 17 and cleaning device 19. The above-mentioned toner image formed on photoreceptor drum 10 is transferred on the upper surface of recording paper P which has been fed in such a manner that it is brought into contact with photoreceptor drum 10 by means of recording paper conveyance section 7, which is the second page, by means of transfer device 14c. In this occasion, an image for the first page located on toner image receiving body 14a is not transferred onto recording paper P, and exists on toner image receiving body 14a. Next, by means of rear surface transfer device 14g, which is the second transfer means, in which voltage having an opposite polarity (in the present embodiment, a positive polarity) is impressed, an image for the first page located on the circumference of toner image receiving body 14a is collectively transferred onto the lower surface of recording paper P.

Recording paper P in which a double-sided copy mode is selected and a color toner image is formed on both sides of recording paper P is subjected to charge-elimination by means of paper separation AC charge eliminator 14h, and separated from toner image receiving body 14a. Aforesaid recording paper P is conveyed to fixing device 17 composed of two rollers each having a heater inside thereof. Between fixing roller 17a and pressure roller 17b, heat and pressure are applied. Due to this, toners adhered on the front surface and the rear surface of recording paper P are fixed so that images are recorded on both surfaces thereof. Aforesaid recording paper P (copy) is discharged to tray 76 outside the apparatus.

Toner remained on the circumference of toner image receiving body after the toner has been transferred is cleaned by toner image receiving body cleaning device 14i. Toner remained on photoreceptor drum 10 after the toner has been transferred is subjected to charge elimination by means of image carrier AC charge eliminator 16. Following this, aforesaid toner moves to cleaning device 19, and is scraped out into cleaning device 19 by cleaning blade 19a composed of rubber material which is brought into contact with photoreceptor drum 10. Aforesaid toner is collected by a waste toner container (not illustrated) by screw 19b. Photoreceptor drum 10 in which remaining toner has been removed by cleaning device 19 is subjected to uniform charging by scorotron chargers 11. Toner image receiving body 14a is rotated in a direction shown by dot arrow "a" in FIG. 1 with the shaft of driving roller 14d as the center, and then enters into the next image forming cycle while aforesaid toner image receiving body 14a is separated from photoreceptor drum 10.

In the present embodiment, paper discharge sensor S1, which is a paper discharging detection means which detects discharge of the recording paper is provided in the vicinity of the discharging port for recording paper P. Discharging of recording paper P is detected by the falling of a recording paper detection signal from paper discharging sensor S1. When detection frequency by paper discharging sensor S1 becomes equivalent to the number of copying set in operation section 8, copying control section 20 erases image data about an image recorded on recording paper P stored in image memory 3.

When copying number in the copying section is set in operation section 8, image reading of document D is not conducted when copying the second sheet. By outputting image data from the above-mentioned image memory 3 stored simultaneously with image reading, an image is formed. Due to the control by copying control section 20, image are transferred on an image on the odd page and on an image on the even page on the front surface and the rear surface of each recording paper P for the second sheet and thereafter fed from paper feeding cassette 71A or 71B which house recording paper P having a designated size. Recording paper P on which toner images are maintained on an even page and an odd page is fixed. Following this, in the same manner as in the above-mentioned embodiment 1, recording papers are stacked on recording paper ascendingly.

Copying control section 20 measures time until recording paper sensor S2 or S3, which are provided between recording paper P feeding point in cassette 71A or 71B, detects recording paper P and time until recording paper P detected by recording paper sensor S2 or S3 is detected by paper discharging sensor S1. If the measured times are respectively a prescribed time or more, it is judged to be that jamming has occurred. Aforesaid copying control section 20 displays that aforesaid problem has occurred is shown in the display section of operation section 8. Operation on the upstream of the sensor which has detected the jamming of recording paper P is immediately stopped. With regard to the downstream side, operation is stopped after recording paper P existing inside the apparatus is discharged to out of the apparatus. Together with this operation, copying control section 20 stops the operation when document D fed from document loading stand 50 is discharged to document receiver 57 for document conveyance section 5A, when reading sequence of document D located on platen glass 55 is finished for document reading section 5B, when reading operation for one image is finished for writing section 1A for image recording section 1 or when photoreceptor drum 10 rotates one rotation additionally after writing operation of writing section 1A is finished for image forming and transfer section 1B, respectively.

When the operator removes jamming paper from recording paper conveyance section 7 and resumes copying operation by depressing a copying starting button in operation section 8, as shown in FIG. 9, even if feeding of document D onto platen glass 55 is conducted by document conveyance section 5A, document reading section 5B does not read the document immediately. Image data of an image which was recorded on a jammed paper stored in image memory 3 or which was planned to be recorded are called to be inputted in writing section 1A. Based on aforesaid image data, image forming and transferring section 1B, in the same manner as above, forms a toner image on photoreceptor drum 10. Aforesaid toner image is transferred onto recording paper P fed as if it is brought into contact with photoreceptor drum 10 by a recording paper conveyance section 7 to be fixed. Aforesaid recording papers are repeated to be discharged to outside the apparatus. When copying control section 20 recognizes that the sum of the number of recording paper P discharged and the number of recording paper P before jamming is equal to the number of coping set in advance, image data on the front surface and the rear surface stored in image memory 3 are erased. By means of control by copying control section 20, reading of the next document on platen glass 55, copying operation (image recording operation) in image recording section 1 based on aforesaid image data and storage of the image data on the next document read onto image memory 3 are conducted.

According to an example shown in FIG. 9, it is not necessary to return documents corresponding to an image recording onto jammed paper. (copying operation after jamming is conducted by means of image data stored in image memory 3. In image memory 3, updated image data (for 2 pages for the double-sided copying mode, and for 1 page for the single-sided copying machine) read by document reading device 5 is stored. Aforesaid storage is erased by discharging detection information of set number of recording paper P in which an image based on the same image data is recorded. On the erased memory portion, next document image information read by document reading device 5 is stored. Therefore, image memory 3 may have a memory capacity for 2 pages. If image memory 3 has capacity capable of storing 3 or 4 pages, it is possible to read the next document for storing during recording an image. Thus, processing speed can be enhanced. Anyway, aforesaid apparatus can be composed at inexpensive cost.

In the above-mentioned explanation, image memory 3 stores image data of the next document on a space where updated image data has been erased. However, the following type may be used. Namely, in image memory 3, by storing image data of the next document on the updated image data, updated image data are substantially erased, and image data on the next document are newly stored.

In FIG. 9, timing between copying start or copying restart and start of feeding in document or recording paper P by means of ADF 5A and recording paper conveyance section 7, finish of discharge of recording paper P by means of recording paper conveyance section 7 and erasing of storage in image memory 3 and finish of reading data by means of document reading device 5 and start of feeding in document D by means of ADF 5A are coincide not because they are conducted simultaneously. It shows that there are cause-effect relationships that the latter are conducted since the former was conducted. In order to simplify explanation, FIG. 9 shows an operation timing graph of each section in the apparatus when copying number is 2. However, the mechanism is the same when the copying number is 3 or more.

In the present embodiment too, selection either a double-sided copying mode or a single-sided copying mode are conducted as explained in Embodiment 1. Depending upon modes adopted, image forming and discharging methods similar to those explained in FIGS. 5 and 6.

In the same manner as in Embodiment 1, in the double-sided copying mode, as shown in FIG. 5, when copying is conducted for n pages and plural sets, to make a double-sided image by transferring images formed on photoreceptor drum 10 and images formed on toner image receiving body 14a on the front surface and the rear surface of recording paper P of the first page is repeated for plural times. Accordingly, copies for the first page are discharged onto plural of different trays. In the same manner, copies for the 2nd page are discharged onto plural of different trays ascendingly.

In a single-sided image forming mode in which recording papers P to which copying has already been applied are discharged onto tray 76 with toner image surface facing upward, in the same manner as in Embodiment 1, the following simple method is used. Namely, toner images are formed only on photoreceptor drum 10, but not formed on toner image receiving body 14a.

The present invention was applied to a color double-sided image forming apparatus. However, the present invention can also be applied to a monochrome double-sided image forming apparatus.

As explained above, in an image forming apparatus of the present invention, an image can be formed in which an image can be recorded on a recording paper on a real-time basis with reading document image. Therefore, image recording speed (copying speed) is speedy. In addition, when jamming has occurred on a recording paper, the document for jammed recording paper may not be returned to the ADF document loading stand when copying is resumed. Therefore, there must not occur forgetting to return the document to the ADF document loading stand or erroneous returning. Without them, easily, copying operation can be resumed. In addition, in an image forming apparatus of the present invention, storing capacity of a storing means which stores image information is allowed to be small. Therefore, the cost for manufacturing aforesaid apparatus may be inexpensive.

According to a control method of the present invention, a similar effects as the above-mentioned image forming apparatus can be provided. In addition, it is sufficient that the capacity of the image memory may store image data for 2–4 pages even when double-sided copying is conducted. Therefore, processing speed can be enhanced.

According to a control method of the image forming apparatus of the present invention, even when plural copying sets are set, copying speed is so high. In addition, when jamming occurred on a recording paper, forgetting to return the document to the document loading stand can be prevented when resuming copying after removing jammed paper. Copying operation can be resumed easily.

What is claimed is:

1. An apparatus for forming images on at least one surface of a sheet, comprising:

a document conveyer for conveying sequentially plural documents;

a reader for reading image information on the documents and outputting image signals;

a memory for storing the image signals output by the reader;

an image forming unit for selectively forming one of: (i) two page toner images corresponding to the image signals of two pages of the documents separately on two image carrying members, and (ii) a single toner image on one of the two image carrying members;

a transfer unit for transferring the toner images formed by the image forming unit onto the sheet, said two page toner images being transferred onto respective surfaces of the sheet, and said single toner image being transferred onto a single surface of the sheet;

a fixing device for fixing the transferred toner images on the sheet, said two page toner images being fixed simultaneously on the respective surfaces of the sheet, and said single toner image being fixed onto the single surface of the sheet;

a sheet delivering unit for delivering the fixed sheet to outside the apparatus;

a jam detector for detecting an occurrence of a jammed sheet in the apparatus;

a delivery detector for detecting the sheet delivered by the sheet delivering unit; and a control unit for controlling said image forming unit and said memory such that the image signals are eliminated in accordance with a progression of image formation, wherein in a case that the jam detector detects the occurrence of the jammed sheet, said control unit prohibits said memory from eliminating the image signals stored therein until the delivery detector detects a next sheet delivered from the apparatus, so that the selected one of the two page toner images and the single toner image expected to be formed by the image forming unit on the jammed sheet may be properly formed on a following sheet based on the image signals retained in the memory; and a selector for selecting one of a both-surface copy mode and a single-surface copy mode, wherein the control unit controls the memory to store the image signals corresponding to two pages of the documents when the both-surface copy mode is selected and to store the image signals corresponding to the single page of the documents when the single-surface copy mode is selected.

2. The apparatus of claim 1, further comprising a setting unit for setting the apparatus to form a same image on a predetermined plural number of sheets, and wherein when the jam detector detects the occurrence of the jammed sheet, the control unit prohibits the memory from eliminating the image signals stored therein until the delivery detector detects that the sheet delivering unit has delivered the predetermined plural number of sheets.

3. The apparatus of claim 2, wherein one of the two image carrying members comprises a photoreceptor and the other one of the two image carrying members comprises a transfer belt.

4. The apparatus of claim 3, wherein a first page toner image of the two page toner image is formed on the photoreceptor and is transferred from the photoreceptor drum to the transfer belt and a second page toner image is formed on the photoreceptor after the first page toner image is transferred from the photoreceptor drum to the transfer belt.

5. The apparatus of claim 4, wherein the transfer unit comprises a first transfer device for transferring the first page toner image from the transfer belt to a first surface of the sheet and a second transfer device for transferring the second page toner image from the photoreceptor to a second surface of the sheet.

6. The apparatus of claim 1, wherein the jam detector comprises a sheet sensor for detecting passage of the sheet conveyed by the sheet conveying unit and a time counter for measuring a time from detection of the passage of the sheet by the sheet sensor and detection of the delivery of the sheet by the delivery sensor.

7. The apparatus of claim 6, wherein the jam detector judges that the sheet is jammed when the time measured by the time counter becomes longer than a predetermined time.

* * * * *